US008799191B2

(12) United States Patent
Kayser

(10) Patent No.: US 8,799,191 B2
(45) Date of Patent: Aug. 5, 2014

(54) METHOD AND SYSTEM FOR GENERATING A PREDICTION NETWORK

(76) Inventor: Christian Kayser, Munich (DE)

( * ) Notice: Subject to any disclaimer, the term of this patent is extended or adjusted under 35 U.S.C. 154(b) by 407 days.

(21) Appl. No.: 13/198,394

(22) Filed: Aug. 4, 2011

(65) Prior Publication Data

US 2012/0036092 A1 Feb. 9, 2012

(30) Foreign Application Priority Data

Aug. 4, 2010 (DE) .......................... 10 2010 038 930

(51) Int. Cl.
*G06F 15/18* (2006.01)

(52) U.S. Cl.
USPC ........................................................ 706/12

(58) Field of Classification Search
CPC .......... G06Q 30/0202; G06Q 30/0206; G06Q 30/0201; G06Q 30/0283; G06Q 40/04; G06Q 10/04; G06N 5/02; G06N 7/005; G06F 17/18
See application file for complete search history.

(56) References Cited

U.S. PATENT DOCUMENTS

| | | | | |
|---|---|---|---|---|
| 5,761,442 A * | 6/1998 | Barr et al. | .................... | 705/36 R |
| 6,151,582 A * | 11/2000 | Huang et al. | ................. | 705/7.25 |
| 7,287,000 B2 * | 10/2007 | Boyd et al. | .................. | 705/14.43 |
| 7,409,676 B2 * | 8/2008 | Agarwal et al. | ............... | 717/120 |
| 7,590,554 B2 * | 9/2009 | Chen et al. | .................... | 705/7.28 |
| 7,631,222 B2 * | 12/2009 | Hasan et al. | ..................... | 714/26 |
| 7,930,159 B1 * | 4/2011 | Florissi et al. | .................. | 703/13 |
| 8,321,303 B1 * | 11/2012 | Krishnamurthy et al. | ...... | 705/28 |
| 8,380,607 B2 * | 2/2013 | Bollen et al. | ................. | 705/36 R |
| 8,433,604 B2 * | 4/2013 | Rai et al. | ........................ | 705/7.38 |
| 2002/0082902 A1 * | 6/2002 | Ando et al. | ..................... | 705/10 |
| 2002/0152185 A1 * | 10/2002 | Satish Jamadagni | ............. | 706/1 |
| 2003/0225654 A1 * | 12/2003 | Chavas et al. | ................... | 705/36 |
| 2006/0041659 A1 * | 2/2006 | Hasan et al. | .................. | 709/224 |
| 2006/0112175 A1 * | 5/2006 | Sellers et al. | .................. | 709/223 |
| 2007/0106550 A1 * | 5/2007 | Umblijs et al. | ................. | 705/10 |
| 2007/0208614 A1 * | 9/2007 | Arnett et al. | .................... | 705/10 |
| 2008/0037443 A1 * | 2/2008 | Ansari et al. | .................. | 370/254 |
| 2008/0114581 A1 * | 5/2008 | Meir et al. | ....................... | 703/13 |
| 2008/0140305 A1 * | 6/2008 | Kim et al. | ..................... | 701/117 |
| 2008/0154693 A1 * | 6/2008 | Bateni et al. | .................... | 705/10 |
| 2008/0243721 A1 * | 10/2008 | Joao | ........................... | 705/36 R |
| 2008/0262900 A1 * | 10/2008 | Duffy et al. | ..................... | 705/10 |
| 2009/0076980 A1 * | 3/2009 | Ameriks et al. | ............. | 705/36 R |
| 2010/0138274 A1 * | 6/2010 | Bateni et al. | .................... | 705/10 |
| 2010/0169166 A1 * | 7/2010 | Bateni et al. | .................... | 705/10 |
| 2010/0179930 A1 * | 7/2010 | Teller et al. | ..................... | 706/12 |
| 2011/0047004 A1 * | 2/2011 | Bateni et al. | .................... | 705/10 |
| 2012/0036092 A1 * | 2/2012 | Kayser | ........................... | 706/12 |
| 2012/0066024 A1 * | 3/2012 | Strongin, II | ................. | 705/7.31 |
| 2012/0303411 A1 * | 11/2012 | Chen et al. | ................... | 705/7.31 |

OTHER PUBLICATIONS

Erb et al., "Forecasting International Equity Correlations", Nov.-Dec. 1994, Financial Analysts Journal, pp. 32-45.*

* cited by examiner

*Primary Examiner* — Alan Chen
*Assistant Examiner* — Paulinho E Smith
(74) *Attorney, Agent, or Firm* — Myers Wolin, LLC

(57) ABSTRACT

A system and method for creating a network from a number of nodes and edges, where each node is assigned data from at least one data source, the data of a data source being changeable, and wherein the data assigned to a node describe single forecasts from a prediction market, the method comprising structuring the data according to a predefined taxonomy, performing a pattern recognition within data assigned to at least two nodes, whereby the pattern recognition determines and analyzes at least two sequences of patterns of changes, comparing the sequences of patterns and deriving a correlation between the sequences of patterns from the comparison result, wherein the correlation defines the dependency between the nodes; and storing the sequences of patterns and the dependency in a pattern database, whereby the dependency forms an edge between the nodes.

8 Claims, 8 Drawing Sheets

METHOD AND SYSTEM FOR GENERATING A PREDICTION NETWORK

CROSS REFERENCE TO RELATED APPLICATIONS

The present application claims priority to German Patent Application No. 10 2010 038 930.7 filed Aug. 4, 2010, the entire contents of which are incorporated herein by reference.

FIELD OF THE INVENTION

The invention relates to a method for creating a network from a number of nodes, where each node is assigned data from at least one data source. Further, the invention relates to a method for evaluating individual forecasts in a prediction market from a network of prediction markets, which has been created with the inventive method for creating a network from a number of nodes. Furthermore, the invention provides a system for creating a network from a number of nodes, where each node is assigned data from at least one data source.

STATE OF THE ART

Prediction markets are virtual market platforms that predict the outcome of events. Their function and effectiveness as a competitive system to other forecasting tools, such as surveys, statistical extrapolations and/or modeling in the political science research and in individual projects, has been proven repeatedly.

The principle is based on the evaluation of future events by independent actors. A central building block for the accuracy of prediction markets is an incentive system. Actors are rewarded for disclosing relevant information about a future event early and weighted on their prognosis.

The difficulty here is the effective application of prediction markets in complex topics such as program management, risk prevention, etc., due to the necessary elements of information being widely distributed, i.e. there is an insufficient information density for efficient and meaningful prediction and the right players are not available or are difficult to reach.

Thus it is known to use prediction markets for political elections. With more complex requirements there are a higher number of questions to trigger points, which in totality cannot be handled by the same group of people. An accurate and early prediction of events requires a minimum number of players that cannot always be guaranteed with very detailed questions. In these cases, early prediction is not possible or only insufficiently possible.

OBJECT OF THE INVENTION

The object of the invention is therefore to provide a method and system which overcomes the disadvantages known from the state of the art and which allow for highly fragmented, i.e. distributed data to continuously and sustainably improve the predictive quality of prediction markets.

Solution According to the Invention

Accordingly, provided is a computer-implemented method for creating a network from a number of nodes and edges, where each node is assigned data from at least one data source, whereby the data from a data source can be modified and whereby the data assigned to a node describe single forecasts from a prediction market. The method comprises the following steps:

(a) structuring data according to a predefined taxonomy;
(b) performing a pattern recognition in a first node associated with data, wherein the pattern recognition determines at least a first sequence of patterns of changes in the first data and analysis;
(c) performing a pattern recognition in a second node associated with data, whereby the pattern recognition determines and analyzes at least a second sequence of patterns of changes in the second data;
(d) comparing the first sequence of patterns with the second sequence of patterns and deriving a correlation between the first sequence of patterns and the second sequence of patterns from the comparison result, wherein the correlation defines a dependency between the first node and second node, and
(e) storing the sequence of patterns and the dependency in a pattern database, whereby the dependency forms an edge between the first node and second node.

Compared to the use of individual prediction markets, this gives a higher reliability of the prognosis and the possibility to recognize the driving factors behind changes, identify their impacts and/or influence the outcome earlier and more effectively. The structured relationship values (dependencies) from the individual forecasts form a pattern database, which calculates the proportionality for future predictions and which formulates chains between individual events and prediction markets.

Thus, changes between remote factors are detected sooner and are set in the right proportion to forecasted events without time loss. In addition, the information density of the underlying data for a forecasting is significantly increased, resulting in a significantly improved predictive quality of prediction markets.

Preferably, the method comprises the steps:

(f) creating a chain between the first node and a third node, whereby there is no dependency between the first node and the third node according to steps (b) through (e), wherein the first node in the network is reachable via a path from the third node, the path comprising a number of dependencies, and whereby the chain between the first node and third node is derived from the number of dependencies, and
(g) storing the chain between the first node and the third node in the pattern database, whereby an edge between the first node and the third node is created by the chain.

Thus, the information density of the underlying data for a forecasting is further increased, leading to an even better predictive quality of prediction markets.

The predetermined taxonomy may comprise at least one of temporal classification scheme, geographical classification scheme, and logical classification scheme.

It is advantageous when the dependencies and/or the chain between any two nodes of the network are defined (i.e. the edges between two nodes of the network) as a mathematical and/or logical mapping.

At least two nodes of the network may be aggregated to a parent node, a child node and/or a neighbor node of the network.

The network may describe a network of prediction markets.

A computer-implemented method for evaluating individual forecasts in a prediction market of a network of prediction markets is also provided, which has been created by the inventive method for generating a network from a number of nodes and edges. The method comprises the steps:

a) detecting an assessment of an individual forecast, which is assigned to a first node of the network;

b) evaluating an individual forecast, which is assigned to a second node of the network, wherein the evaluation depends on the detected assessment and the correlation (dependency) between the first node and the second node;

c) generating an overall assessment for the individual forecast assigned to the second node, wherein the overall assessment incorporates the assessment according to step (b), and d) storing the overall assessment in the pattern database The assessment of an individual forecast assigned to the second node can be recorded as an assessment for an individual forecast assigned to a first node of the network. This makes it possible for the first time to hand over modifications to a node through several nodes.

The assessment of the individual forecast in step (b), which is associated with a third node, may be determined in dependency with the assessment collected in step (a) and the linkages between the first and the third note.

Furthermore, there is provided a system for generating a network from a number of nodes and edges, where each node is assigned data from at least one data source, where the data from a data source is structured according to a predetermined taxonomy and where the data from a data source are changeable. The system comprises at least one database to store the data associated with the nodes, patterns of sequence of changes in the data, and dependencies between two nodes;

first processing means which are coupled to the at least one database, and which are configured to identify, analyze and store a first sequence of patterns of changes in the first data in the at least one database;

second processing means which are coupled to at least one database and which are configured to identify, analyze and store a second sequence of patterns of changes in the second data in the at least one database; and comparing means which are coupled to at least one database, and which are configured to compare the first sequence of patterns with the second sequence of patterns, to derive from the comparison result a correlation between the first sequence of patterns and the second sequence of patterns, and to store the correlation as a dependency (edge) between the first node and the second node in the at least one database.

The at least one database may further be configured to store chains between two nodes, and third processing means are provided for creating a chaining between the first node and a third node, whereby there is no dependency between the first node and the third node stored in the database, whereby the third node is reached from the first node in the network via a path comprising a number of dependencies, and whereby the chain between the first node and the third node is derived from the number of dependencies.

Preferably, the system provides input means for receiving modifications to the first data, to second data and/or to the data of the third node, wherein the first, second and third data describe an individual prediction in a prediction market and whereby the modification comprises a modification of an assessment of an individual prediction.

The database or the processing means can be configured to perform, based on a change in an assessment of an individual forecast, a change in an assessment of individual forecasts, which are assigned to other nodes.

Furthermore, the invention provides a data carrier product that contains program code, which is adapted, when loaded into a computer, to create a network from a number of nodes and edges.

In addition, the invention provides a data carrier product that contains program code, which is adapted, when loaded into a computer, to execute the method for evaluating individual forecasts in a prediction market with a network of prediction markets.

BRIEF DESCRIPTION OF THE DRAWINGS

The invention is explained in detail with the help of the drawings. The drawings show.

DETAILED DESCRIPTION OF THE INVENTION

Figure 1:
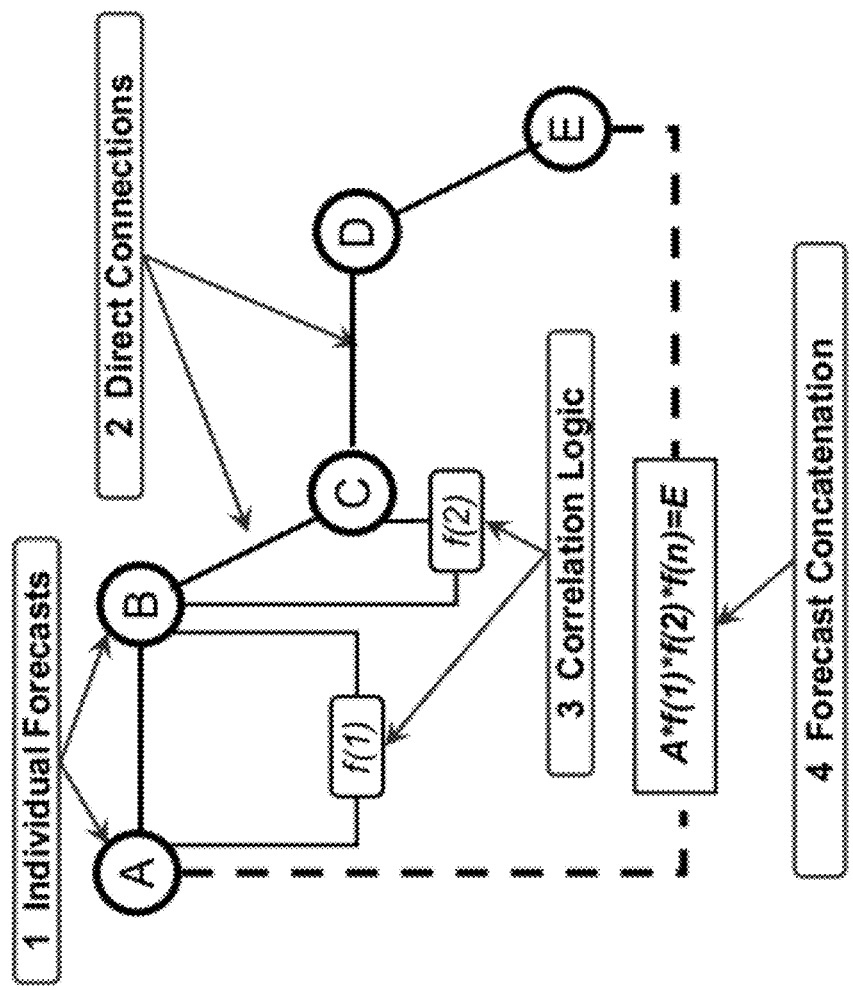
FIG. 1 shows the link between individual event nodes to illustrate the connections between individual forecasts and the logical concatenation of a series of event nodes.

The invention is based on the trigger points of individual actors that are measured in single prediction markets. Event points follow a classification scheme (taxonomy), which allows the collected information for the individual forecasts (e.g. comments) and ratings to make comparable with each other. The forecasts of the individual actors are searched for sequence patterns and stored in a pattern database. Thus, the pattern data base is continuously updated.

In the following an event point is a spatially, temporally and logically well-defined event in the future. A single prediction is described by market transactions and associated comments. A prediction market is formed and described by at least one event point, to which a number of individual forecasts are assigned.

Derived from the pattern data and defined by the logical dependencies, such as tree structures between the trigger points are the resulting mathematical relationships between independent prediction markets. This connection can be used as logic for creating invitation messages (system triggers) in an early warning system and for comparisons to higher-level trigger points and thus move the actors to release further information or reassessment of the event points.

For links that have been repeatedly established by experience in the pattern data and logical dependencies, an automation is created in the system, which performs the expected transactions autonomously. By these nodes logical inconsistencies that arise as a consequence of an evaluation of an event point are compensated in real time.

The pattern database is constantly expanded by experience and replaces correlated behaviors between different markets with the actions of an automated operator. Thus, possible chain reactions between distant systemic risks can be mapped as an information network by a series of individual links. The concatenation of a series of trigger points allows that information and assessments for a single event are propagated on the network of event nodes with immediate effect, preferably in real time.

The automated market activities (the automated actors) and system-relevant comparisons stimulate the players to look their assessments of trigger points under a variety of viewpoints. Increased activity in the markets and divergent perspectives will continuously enrich the level of information for the individual actors. It thus requires fewer players to achieve the same prediction quality from the individual prediction markets and the linkages between distant points become transparent.

As a consequence, individual pieces of information are recovered with improved efficiency for all players, which leads to a higher predictive value of individual forecasts, because

- factors with high frequency and/or action will be taken automatically into their own event forecasts and will therefore allow a more differentiated view of perception and other factors;
- forecasts for the same event are grouped allowing comparison future values;
- early warning systems can be used to synchronize changes with the respective past patterns and to report unexpected developments;
- a consolidated view of the changes in forecasts or for a particular prediction market, a sector or a function is possible, which can reveal structural risks;
- formal links between individual forecasts make the chain visible and changes can be seen earlier and/or
- the perception of changes in event forecasting and real-time system risks can be made as a complement to the classical root-cause analysis.

To increase the density of information for individual markets and accelerate the spread of information between market participants, exchange of information between the prediction markets is provided.

A prediction market can have one or more event points, which respond independently to the transactions of the actors. The individual forecasts performed by the actors change the probability or date of an event. The forecasts are backed up with a bet (points, virtual or real money), where the size of the bet is limited from the start, the actor focuses on specific trigger points and results in its use for that forecast a weight on the statement made. Based on size and time of each job the event date (date, rate etc.) is recalculated and the result is a consensus among the collective intelligence of all actors. It is the incentive for individual actors, to be correct with your assessment of the event so as not to lose to their bet or to increase the value of their bet. As long as the market is active, the players can change their bet. The actor extracts from the new information the possible influencing factors, changes his decision based on the different assessment and shares the newly discovered effects of this event point.

Building a Network Connection

FIG. 1 shows the link (i.e. edges) between individual event nodes to illustrate the connections between individual forecasts and the logical concatenation of a series of event nodes, and shows how to create a network from a number of nodes.

The individual forecasts 1 of event points are linked, i.e. edges between individual forecasts are created. The direct connection 2 contains a correlation logic 3, which arises from a logical or historical fact. This means that the direct link is described by a correlation.

An example of connections between individual forecasts are:

- hierarchical relationship between trigger points: a single prediction about the achievement of a subproject A (e.g. testing of product X) is an individual forecast, according to the formula f (1), on achieving the overall project outcome B (e.g., market-ready product X);
- causal connection between trigger points: a single prediction about the high probability of achieving the overall project outcome B (e.g., market-ready product X) allows a single forecast of the expected revenue C (e.g., sales of product X), deduced from the relationship patterns between the individual forecasts as per formula f (2);
- interdependence between trigger points: a forecast of the expected revenue C (e.g., sales of product X) has an indirect effect on D (e.g., sales of product Y) and E (e.g. margin of product Y), which can be played out in formulas.

The prediction chain 4 allows the individual prediction for the subproject A to be relayed through the event nodes in correct proportion and as independent predictions to the future event B up to E. The formula of the chain is derived from the aggregated correlation logic 3 of the direct linkage 2.

Role of Classification (Taxonomy)

Figure 2:
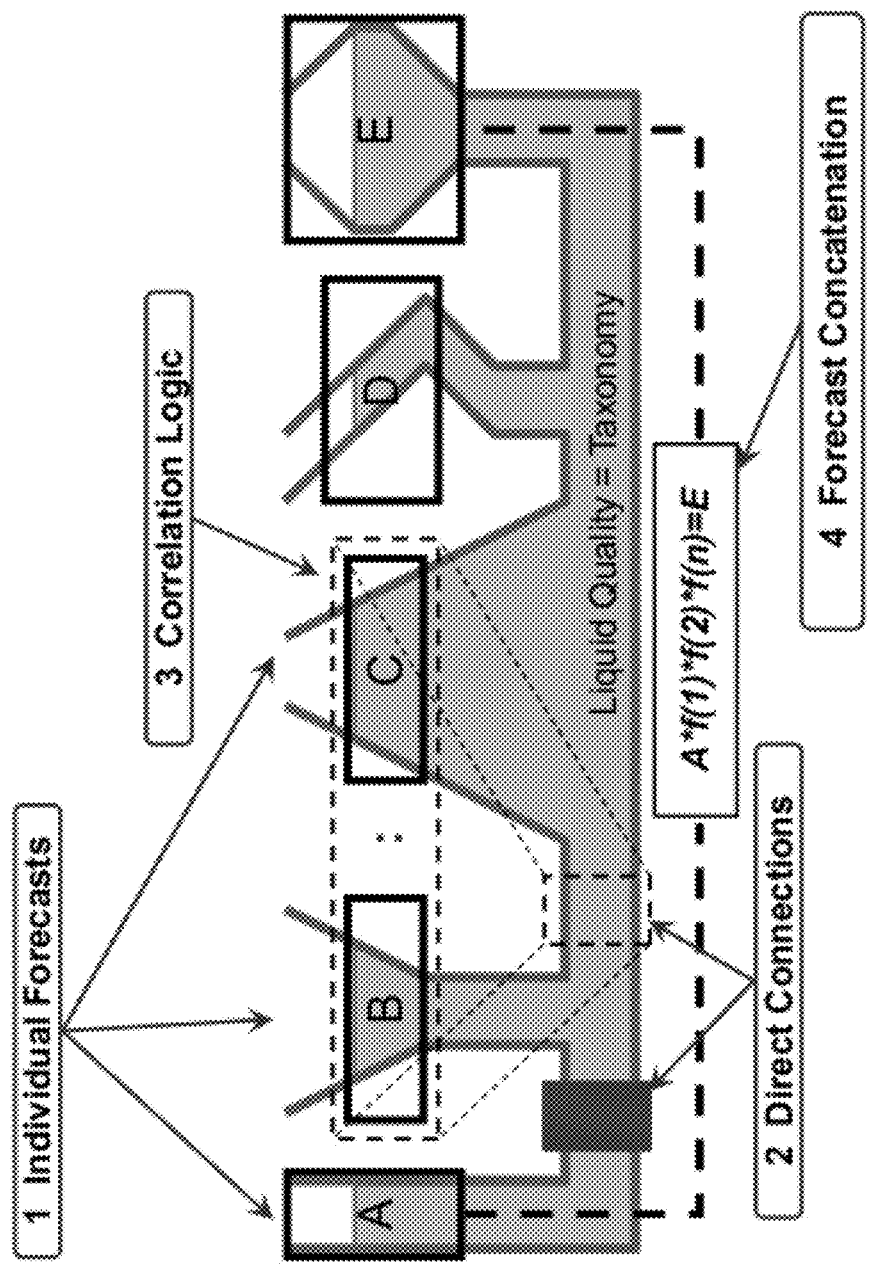
FIG. 2 illustrates the invention in communicating vessels, to show how a reference is made between individual forecasts and how to represent the possible mathematical relationships.

With reference to FIG. 2, the invention is illustrated by using communicating tubes.

Of utmost importance to the invention is the classification scheme (taxonomy) of the defined event points. As shown in FIG. 2 in an analogy of the communicating tunes, it is only possible through a unified scheme to provide the individual forecasts in the right proportion to one another or to capture new connections correctly. A single forecast, e.g. A is influenced in a clearly defined relationship to the event point B, i.e. a positive prognosis (liquid addition) to A will have an impact by directly connecting to point B. A linear effect is possible only on the same base (liquid quality) on the basis of a taxonomy. The correlation 3 between the individual forecasts to the trigger points B and C can proved by a pattern analysis only if the same base is used. Thus there can be more event points connected 4 and the resulting connections give further impetus to the individual forecast.

Each defined event point follows a certain taxonomy that allows relationships between individual forecasts to be identified and utilized. Examples of classifications of the total schemes are:

- temporal classification scheme for months, quarters, calendar and/or financial years;
- geographic classification scheme for countries, regions, continents, economic and political alliances;
- logical classification scheme for user data, organizational connections, objectives, functions, industries and business forms, etc.

Figure 3:
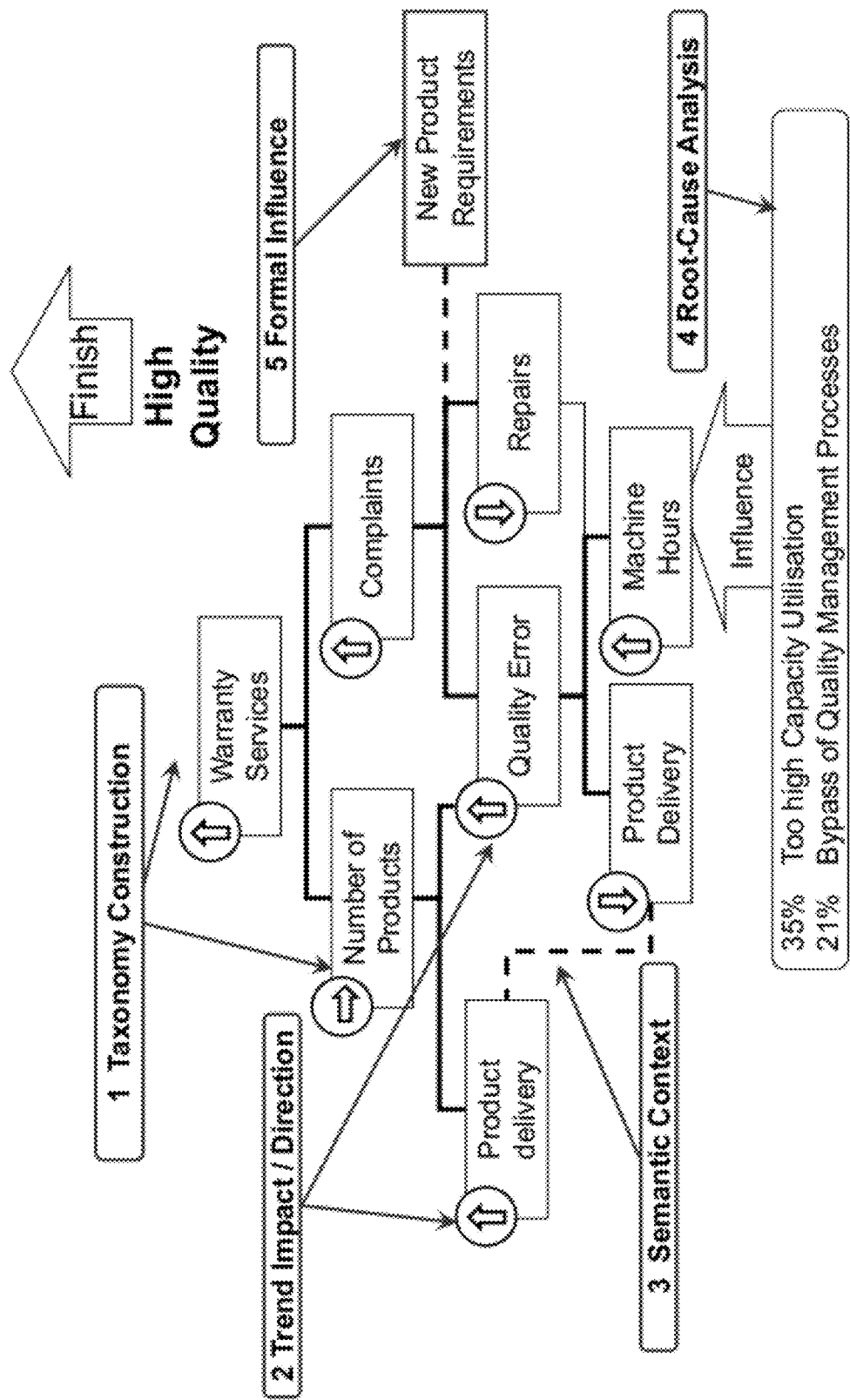
FIG. 3 shows the construction of a logical tree structure that shows the logical dependencies between individual forecasts and the networking event of the points due to logical relationships.

FIG. 3 shows the construction of a logical tree structure that shows the logical dependencies between individual forecasts and the networking event of the points due to logical relationships.

The construction of a logical tree structure in FIG. 3 is explained with the example of warranty. To simplify, the event represented with the simple title: "warranty" would, in the prediction market be a question to the company's success, as in "What guarantee performance over the total number of products in the first quarter, X is expected from Europe?".

The taxonomy 1 describes the "warranty" as a function of "number of products" and the "number of complaints inputs". The event item "warranty" is defined with a logical taxonomy as a formula between the "number of products" and "number of complaints inputs". The result and the components of the formula represent event points and are held timely (first quarter) and geographically (Europe) in relation. By a transaction logic, a single forecast will impact on the number of "complaints inputs" or "number of products" at the event point of the "warranty" in a linear fashion. The direction and strength of influence 2 results, looking from bottom to top, from the taxonomy, and the impact, looking from top to bottom, from the experience values of the pattern analysis. If it is assumed that the "number of products" from a historical analysis has no significant influence on the "warranty", then a single prediction of the "warranty" directly affect "complaint inputs".

Another logical connection results from the semantic context (3), which for example, connects the event points of the "product delivery", e.g. from the perspective of production, with the marketing. I.e., an event of the start point of delivery is shown in two different functions, and is only in the literal context close together. Only the common taxonomy allows the individual forecasts to compare and connect them automatically.

Part of the inventive method is to expand the logical structures in accordance with the individual experiences of the actors and to the state of current knowledge. A root cause analysis 4 individual forecasts allows the determination of the influencing factors. The presentation includes a count of text features (tags), which are summarized as a number or percentage. The continuous pattern analysis captures the temporal, geographical and logical repetitions of these factors. Should there be a statistical or a demand-orientated basis, the influencing factors are formalized 5 as further event points as well as part of the logical taxonomy.

Pattern Analysis and Correlation Design

Figure 4:
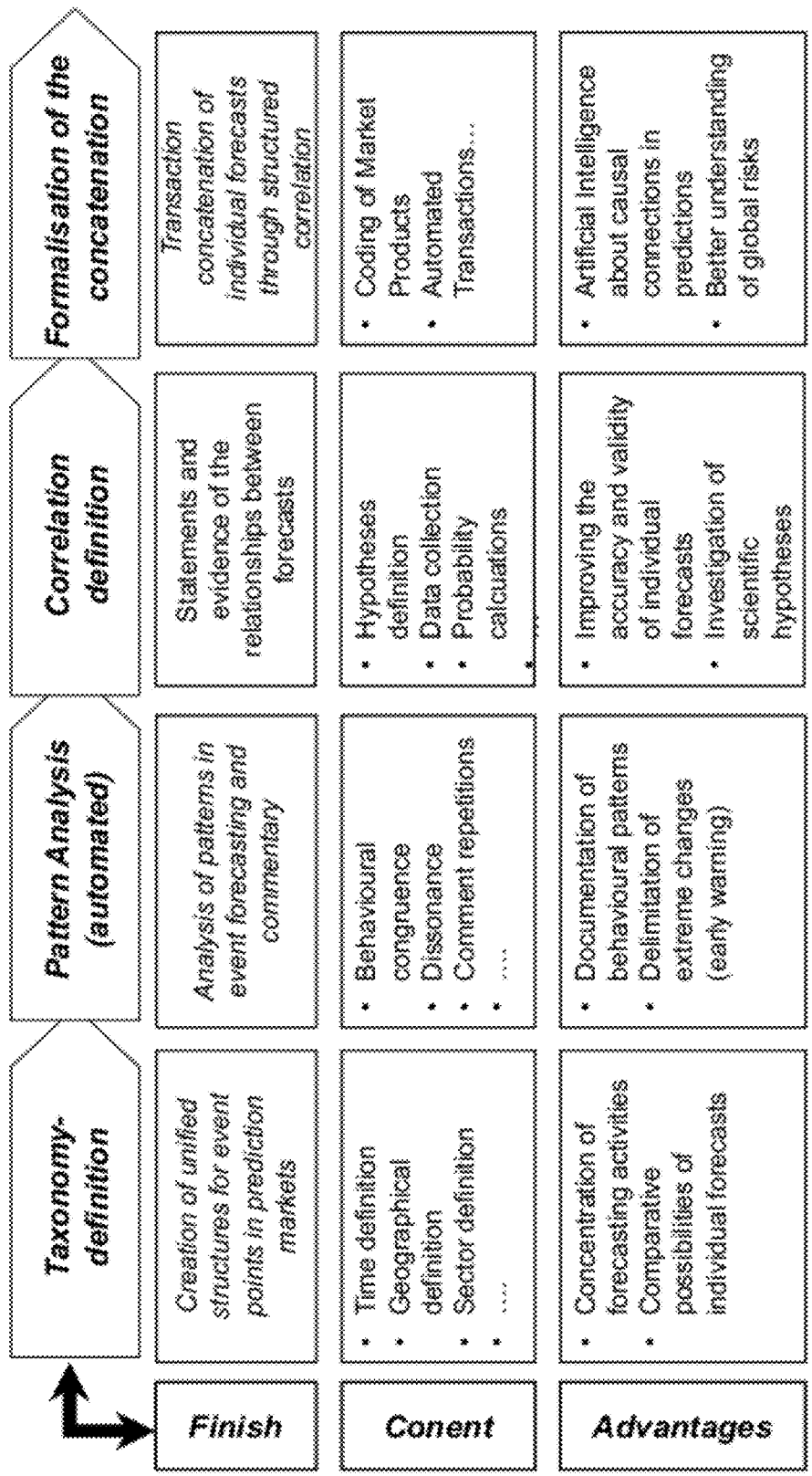
FIG. 4 shows a flowchart for a process flow of the method.

FIG. 4 shows a flowchart for a process flow of the inventive method, particularly the sequence of an inventive pattern analysis and correlation design.

The taxonomy creates uniform structures for event points to frame individual forecasts. Standardized definitions of time frames (e.g. day, week, month, quarter, year) facilitate a consideration of the timing sequence of events. Geographic definitions allow regional analysis capabilities (e.g. city, countries, continents) and sectors allows a cross-functional view of this statement. Concentration of individual forecasts is achieved solely by the taxonomy, as redundant questions are avoided. The first logical analysis approach is the comparison of the individual forecasts over a time sequence, as well as consolidated regional and industry-specific indicators. These comparisons can be used to enhance the activities of individual players.

The pattern analysis and pattern recognition recognizes the pattern of predictions, comments and information from the individual actors. The analysis is preferably achieved automatically, and for most of the requirements and the different analysis approaches statistical behavior patterns are achieved. There are, among other things:
- congruence by several market participants according to temporal, regional, etc. aspects;
- dissonances i.e. extreme deviations or collective forecasting activities, which are caused by events, and
- comment repetitions on individual forecasts are analyzed.

Assumptions about future predictions can also be included in the model analysis to explore relationships and behavior in unproven context of the individual forecasts. The actors in the market can set boundaries on potential extreme values or references to pattern values for their own purposes (see also FIG. 5), these in turn help the pattern analysis to make the relationship within of and between event points statistically relevant.

On basis of the pattern analysis the behavioral profiles are searched for inferences and correlation definitions are automatically constructed as hypothesis and backed up by patterns within the individual prediction and trigger points. A mathematical and logical formula reflects the relationship between trigger points and acts as a node between the forecast events spanning multiple points. The correlations between information and event forecasts may already be used for improving individual predictions used by players without having to be formalized as automation in the marketplace. Here, aggregated event points (as in FIG. 6) are available, which can be used as an impulse to improve the individual prognosis.

The formalization of the concatenation happens only for the correlations demonstrating a clear pattern and benefits, i.e. using artificial intelligence, can drill through the actions of the masses faster and more accurately. Thus, the prediction markets can be coupled together transactionally, and the causalities between distant events are made transparent.

Analysis of Time Series Models in Forecasting

Figure 5:
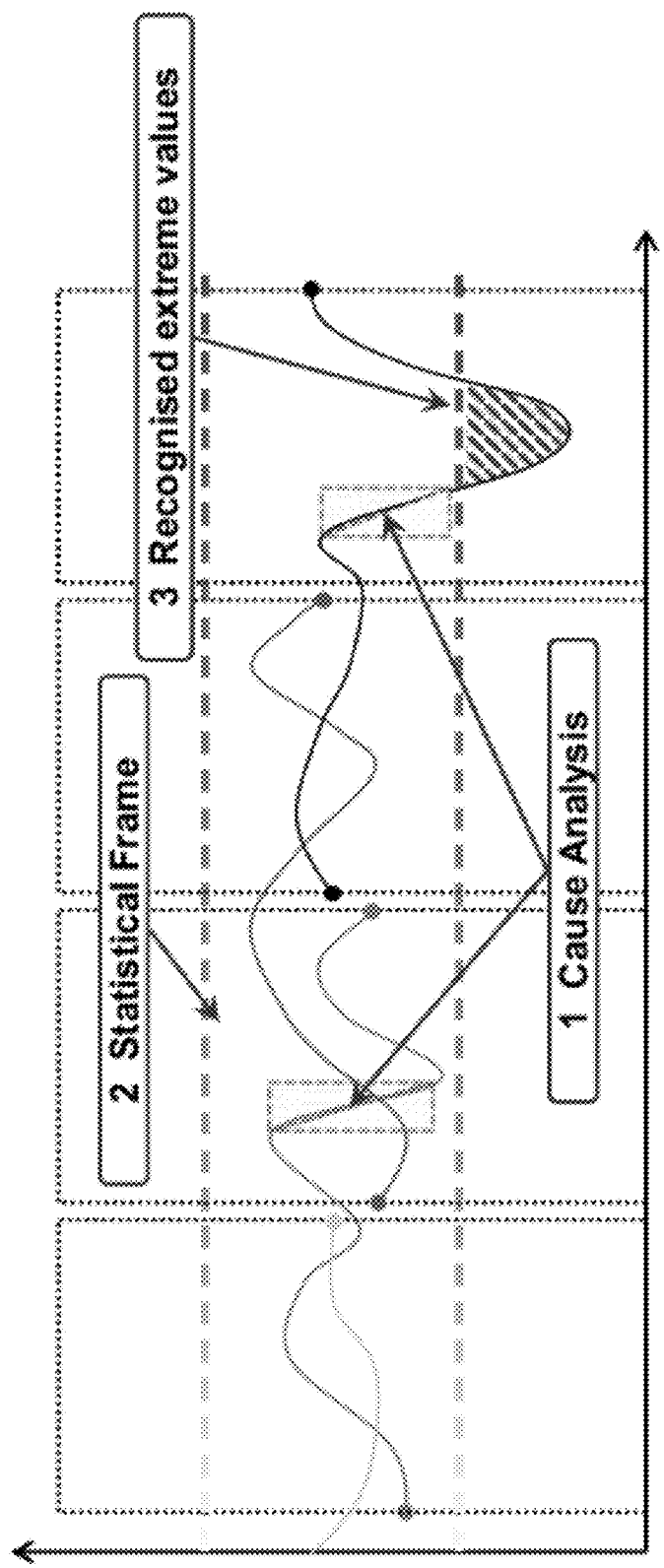
FIG. 5 shows an analysis of time series patterns of predictions.

FIG. 5 shows an operation of the pattern analysis and exploitation of knowledge resulting from the analysis of time series patterns of predictions. Shown is the temporal variation of probabilities of several time-points of the same event taxonomy. For comparisons of different classification groups (geographical, logical, etc.) a unified taxonomy must be taken for the correct interpretation of the data background. In this example, the timing within the system (sequence and time) defines the root cause analysis 1. The found patterns of user data, forecasts, forecast transactions and forecast commentary result in a statistically analyzable image about the factors influencing the change over time. With sufficient statistical proof load factors can be defined on the basis of these data points as a separate event.

The statistical expression of repetitive forecasting developments result in a statistical frame 2, which outlines the likely development of future forecasts. This statistical framework can also be made of the expectations of individual actors in messages triggering event points to be deduced or confirmed. It may happen that a dissonant behavior on the market reaches extreme values, which triggers, because of the statistical framework, a system trigger. The recognized extreme value 3 triggers a series of automatic actions, such as:
- a timely root cause analysis 1, which compares previous pattern with historical values and highlights new factors;
- inform the players that have given a forecast for the event or have set a statistical frame 2, about the development and potential influencing factors, and
- contribute unexpected developments including statistical relevance and potential influence factors to trigger points and nodes that have a logical or historically connection.

Use of Higher-Level Structures Comparison

The construction of a logical structure based on the unified taxonomy gives different levels of trigger points for differentiated individual forecasts. The players in the market can focus on one event point, and the prediction made benefit directly to forecasts of related future events.

Figure 6:
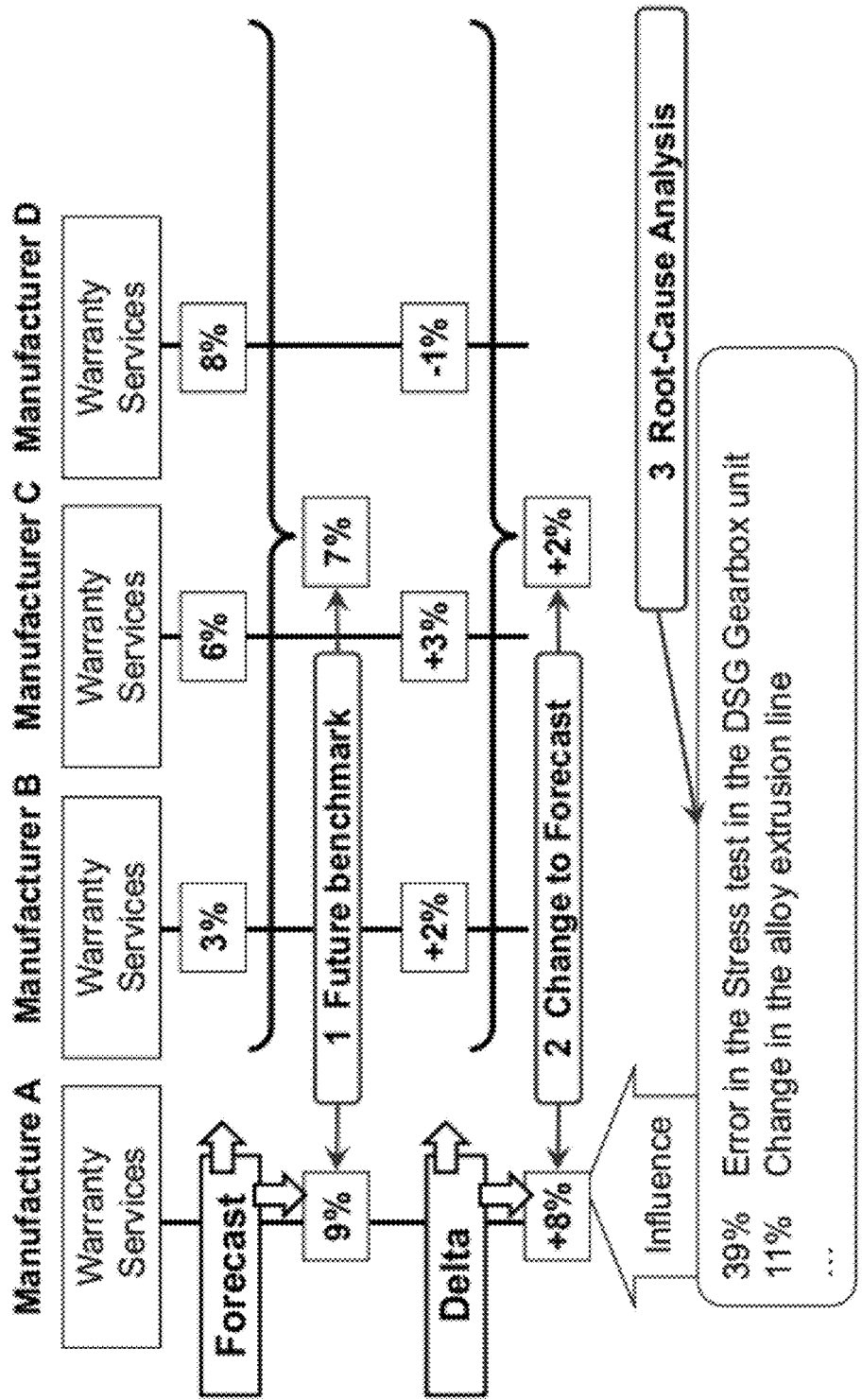
FIG. 6 illustrates different levels of aggregation structures and the dependency on individual trigger points.

The parent structures in FIG. 6 show—using the disaggregated structural tree in FIG. 3—the various level, which can be addressed with the approach. In this scenario, the quality class based on the "warranty" of individual automobile manufacturers will be calculated. By using the uniform formal taxonomy (e.g. warranty=Refund costs/number of products) it is possible to assess the percentage "guarantees" for the logical grouping of a class. It is therefore also possible to establish the event point of class quality for an independent point of predictions and obtain assessments by more actors.

The comparisons at a higher level allow the actors and the automatic pattern recognition to find a relation basis to an individual change. As an example, one benchmark in the future, the percentage of 9% may be only 2% percentage points above the class average, but shows a forecast change in 2 of 8% versus 2% in the class a serious deterioration. A root cause analysis 3 explains the origin of the different assessment.

The problem for the predictive quality of prediction markets is the possible release of negative forces through the incentive system. If a future event (e.g. terrorist attack) can be influenced by a person, a risk analysis based on a prediction market would provoke this event, i.e. have a self-fulfilling prophecy result.

Figure 7:
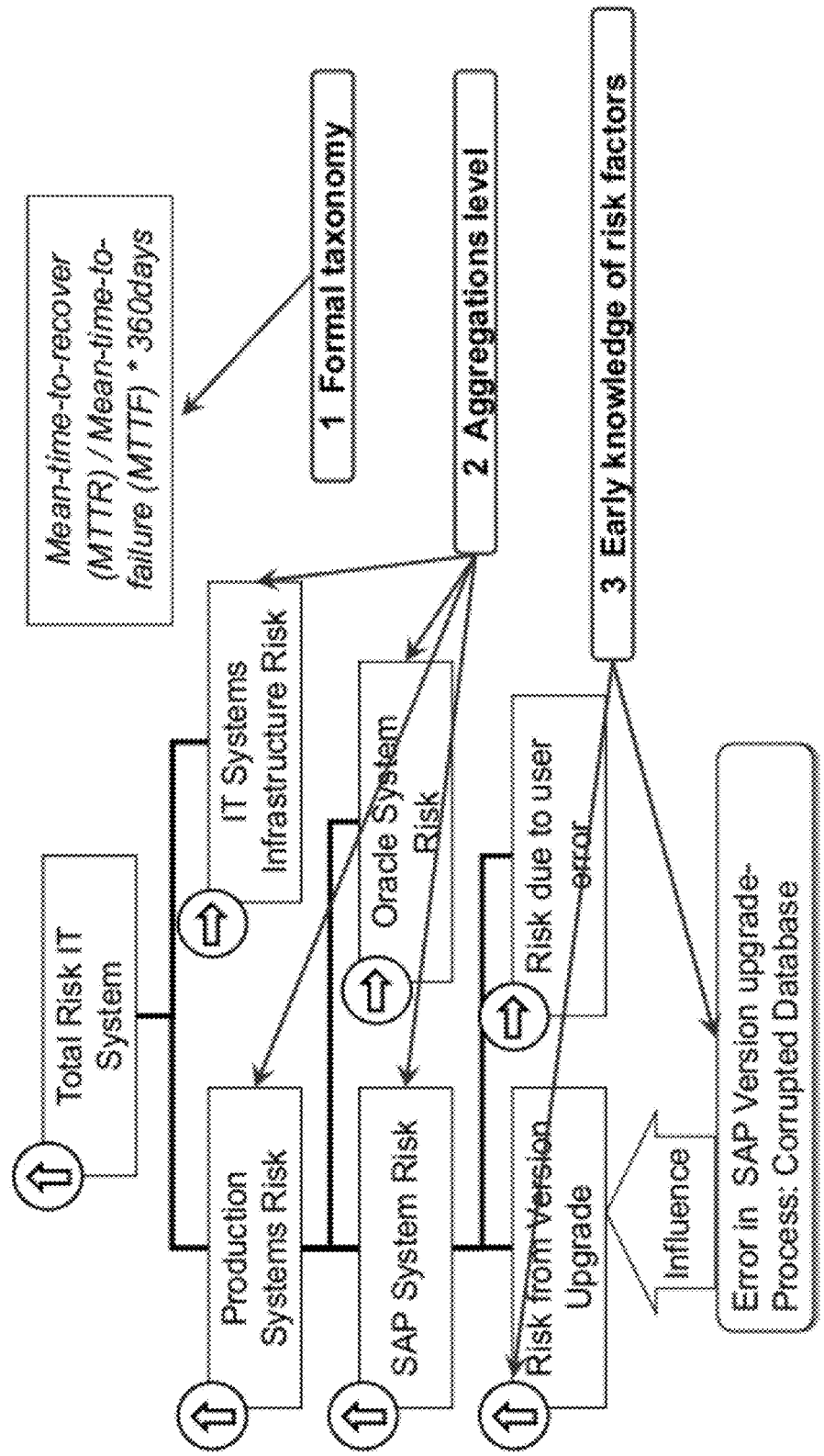
FIG. 7 shows a logical structure for risk prediction, which shows how distributed information aggregation levels and a formal taxonomy are split from one event to the next point.

The structure formation for risk prediction—as shown in FIG. 7 using an example of the IT system stability—is possible by building a tree structure and within a taxonomy, as several individual forecasts are aggregated across levels and thus a large number of positive predictions compensates a negative single force. A short-term advantage to taking a global risk is thus largely excluded, however, relevant information will be carried forward to correlate individual markets. The formal taxonomy 1 enables the inventive system to reach the different aggregation levels through automated forecasting and information dissemination. In a case of, e.g., an error in a standard procedure that is relevant to the entire risk of all SAP systems, this will be visible as early detection of risk factors for all three event-related nodes.

Real-Time Detection and Analysis of Event Chains

According to the current state of the art the actors can make deduction from their event predictions and the predictions of others on a forecasted events towards possible implications and effects towards other events in the future.

Figure 8:
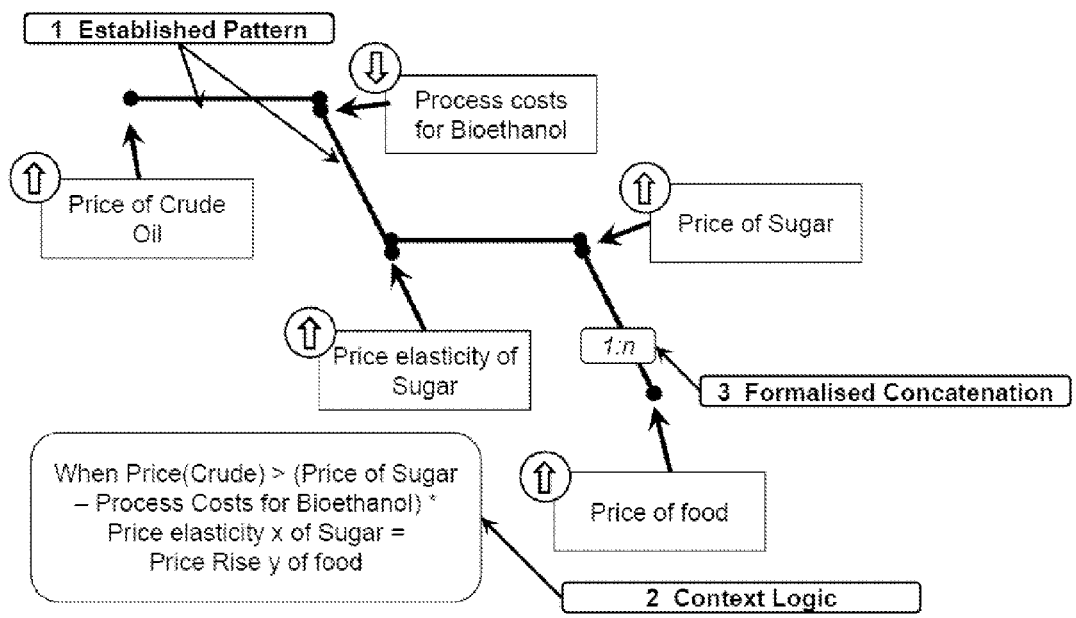
FIG. 8 shows an example of a chain of independent event points.

According to the connection between crude oil and food prices in FIG. 8 it is clear that for the detection and prediction of event knowledge and linkages of the focus of individuals is not sufficient to evaluate empirically the event node correctly and in full depth. The steady expansion of the correlation logic and automation in the inventive system and method allow the production of bridges to a network of mathematical and logical operations. In this context the established pattern 1 from the pattern database serves to establish the empirically evidential proof for the relationship logic 2. The formalized links 3 allow to capture the links between future events in real time through the discussed automation within the procedure and direct preventative measures in time.

I claim:

1. Computer-implemented method for creating a network from a number of nodes and edges, where each node is assigned data from at least one data source, the data of a data source being changeable, the data assigned to a node describing single forecasts from a prediction market, the method comprising;
    (a) structuring the data according to a predefined taxonomy;
    (b) performing a pattern recognition within first data, the first data being assigned to a first node, whereby the pattern recognition determines and analyzes at least a first sequence of patterns of changes in the first data;
    (c) performing a pattern recognition within second data, the second data being assigned to a second node, whereby the pattern recognition determines and analyzes at least a second sequence of patterns of changes in the second data;
    (d) comparing the first sequence of patterns with the second sequence of patterns and deriving a correlation between the first sequence of patterns and the second sequence of patterns from the comparison result, wherein the correlation defines the dependency between the first node and the second node;
    (e) storing the sequence of patterns and the dependency in a pattern database, whereby the dependency forms an edge between the first node and the second node
    (f) creating a chain between the first node and a third node, where there is no dependent defined between the first node and the third node according to steps (b) through (e), wherein the first node in the network is reachable via a path from the third node, the path comprising a number of dependencies, and wherein the chain between the first node and third node is derived from the number of dependencies; and
    (g) storing the chain between the first node and the third node in the pattern database, the chain creating an edge between the first node and the third node.

2. The method according to claim 1, wherein the predefined taxonomy comprises at least one of temporal geographic classification scheme, classification schema, and logical classification scheme.

3. The method according to claim 1, wherein the dependencies and/or the chains between two nodes of the network are defined as mathematical and/or logical mappings.

4. The method according to claim 1, wherein at least two nodes of the network are aggregated to a parent node and/or a child node and/or a neighbor node of the network.

5. The method according to claim 1, wherein the network describes a network of prediction markets.

6. Computer-implemented method for evaluating individual forecasts in a prediction market of a network of prediction markets, which has been created according to one of the preceding claims, comprising:
    (a) detecting an assessment of an individual forecast, which is assigned to a first node of the network;
    (b) evaluating an individual forecast, which is assigned to a second node of the network, wherein the evaluation depends on the detected assessment and the correlation between the first node and the second node;
    (c) generating an overall assessment for the individual forecast assigned to the second node, wherein the overall assessment incorporates the assessment according to step (b), and
    (d) storing the overall assessment in the pattern database.

7. The method according to claim 6, wherein the assessment for an individual forecast assigned to the second node is recorded as an assessment for an individual forecast assigned to a first node of the network.

8. The method according to claim 6, wherein the assessment of a single forecast created in step (b), which is assigned to a third node, is created as a function of the assessment as detected in step (a) and the chain between the first node and the third node.

* * * * *